Patented Feb. 20, 1951

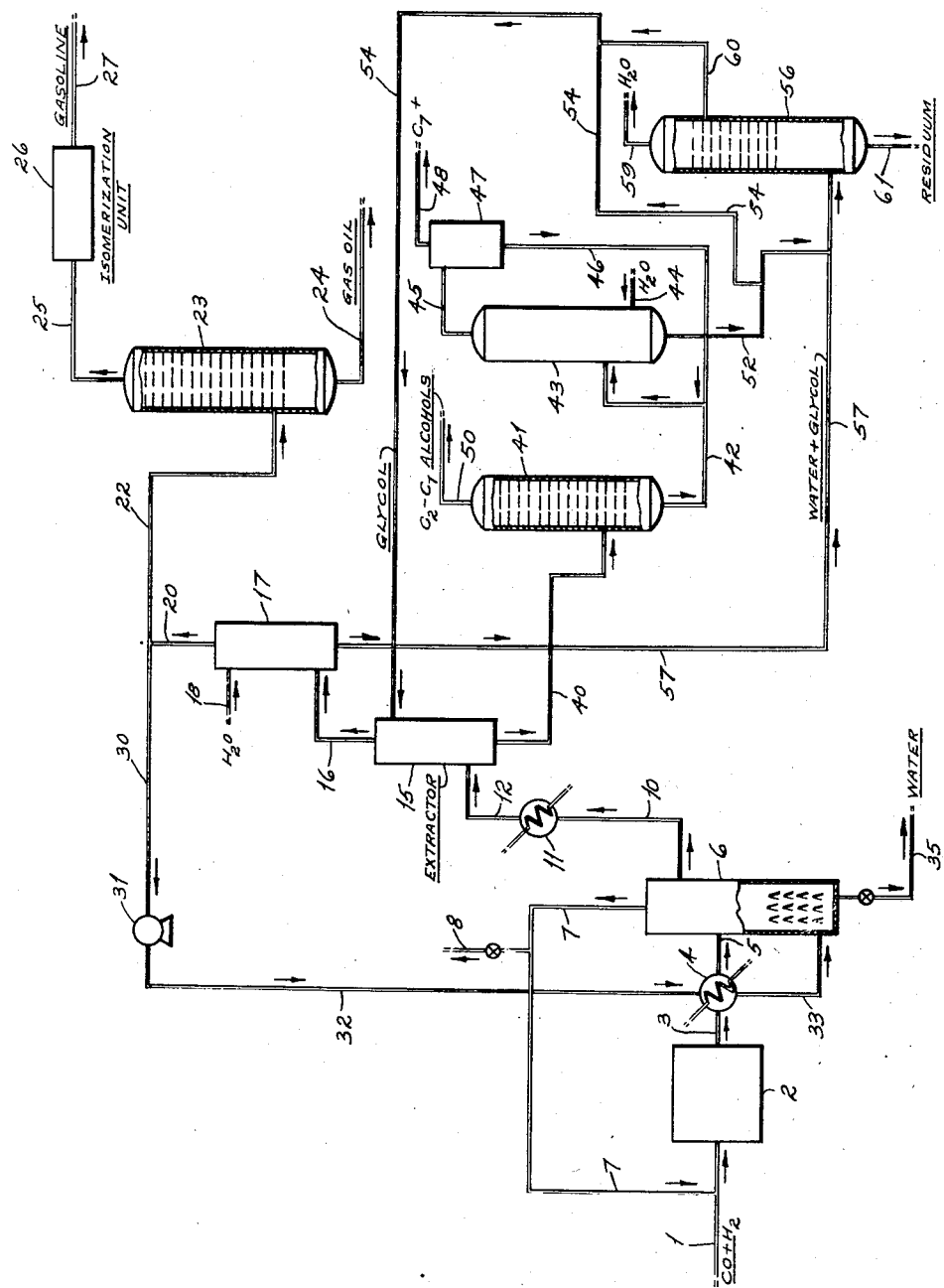

2,542,454

UNITED STATES PATENT OFFICE 2,542,454

PROCESS FOR MANUFACTURING HYDROCARBONS AND ALCOHOLS

George B. Arnold, Glenham, and Howard V. Hess, Beacon, N. Y., assignors to The Texas Company, New York, N. Y., a corporation of Delaware Application August 31, 1946, Serial No. 694,320

3 Claims. (Cl. 260—450)

This invention relates to the production of hydrocarbons and oxygen-containing compounds by the catalytic conversion of carbon monoxide and hydrogen.

In accordance with the invention, synthesis gas comprising carbon monoxide and hydrogen is reacted in the presence of a catalyst to produce a synthesis product containing hydrocarbons, water and oxygen-containing compounds, the major portion of hydrocarbons and oxygen-containing compounds usually comprising compounds having from one to 20 carbon atoms per molecule. The synthesis reaction is advantageously carried out with a synthesis catalyst of the iron type at an elevated temperature which may be in the range of about 450 to 700° F. and at superatmospheric pressure, for example, about 150 to 300 pounds per square inch. Under these conditions, the synthesis product may comprise about two liquid volumes of water and one volume of normally liquid organic compounds. The oxygenated organic compounds comprising mainly alcohols may amount to about from 5 to 20 volume per cent of the total normally liquid product.

The synthesis product stream is introduced to the intermediate portion of a separating column maintained at a temperature of about 175 to 350° F., preferably 200-300° F. and under a pressure in the range of about 150 to 300 pounds per square inch gauge. Advantageously the stream is adjusted to these conditions prior to introduction to the column. There forms in the upper portion of the column a liquid layer comprising a hydrocarbon phase containing substantially all of the alcohol products of more than two carbon atoms per molecule and a large portion of the ethyl alcohol produced in the conversion. It may also contain aldehydes and ketones in relatively small proportions.

In the lower portion of the column, there forms a water phase which contains the remainder of the alcohols produced in the conversion. Small amounts of ketones and aldehydes may also be present in this phase, while practically all of the lower molecular weight fatty acids produced in the catalytic conversion are present therein.

A gas phase also separates in the top of the column. This gas phase comprises unreacted carbon monoxide and hydrogen, carbon dioxide and low boiling organic compounds including light hydrocarbons. It is continuously removed and at least a portion thereof is recycled to the synthesis reaction zone for it has proven advantageous to recycle carbon dioxide as well as unreacted carbon monoxide and hydrogen.

A stream of the aforesaid hydrocarbon phase containing oxygenated products is separately removed from the column. The oxygenated products are thereafter removed from the hydrocarbon phase by solvent extraction with a selective solvent which is substantially immiscible with the hydrocarbon phase.

At least a portion of the hydrocarbon phase, from which oxygen-containing compounds have been removed, is employed to strip from the aqueous phase in the lower portion of the column alcohols, aldehydes and ketones still dissolved therein. This is accomplished by subjecting the water phase to countercurrent contact therein with hydrocarbons which are free from or relatively lean in these oxygen-containing compounds. Treatment of the aqueous phase in this manner effects substantially complete removal of the alcoholic products of conversion therefrom.

The hydrocarbon stripping medium and the oxygen-containing products stripped from the water phase combine with the hydrocarbon phase initially separated from the aqueous phase and the resulting mixture is subjected to solvent extraction with a selective solvent, as previously mentioned.

As a solvent for the extraction of oxygen-containing products from the hydrocarbon phase mixture, there is employed a solvent which has substantially complete solvent action on aliphatic alcohols having from 1 to 20 carbon atoms per molecule and which is substantially immiscible with hydrocarbons at ordinary temperatures. As a result of the extraction, there is obtained a hydrocarbon phase which is substantially free from alcohols and other oxygen-containing compounds, and a solvent-rich extract phase consisting essentially of alcohols dissolved in the solvent. Unless previously removed, aldehydes and ketones will also be present in the solvent-rich phase. Aldehydes and ketones may be removed by treatment with sodium bisulfite solution prior to the extraction. As indicated previously, a portion of the alcohol-free hydrocarbon phase is used to strip residual alcohols from the aqueous phase.

The hydrocarbons from the solvent extraction step, excluding those recycled for reuse as a stripping medium, can be subjected to contact with a catalyst such as bauxite, alumina, fuller's earth or other alumina or silica adsorptive materials at a temperature in the range of 700 to 900° F. so as to effect mainly isomerization of olefinic constituents of the hydrocarbon mixture and removal of impurities.

The hydrocarbons may be fractionated to form a naphtha fraction and a gas oil fraction. The naphtha fraction is then subjected to the catalytic treatment with bauxite or other adsorptive material. The gas oil fraction may be disposed of in any suitable manner. A portion thereof may be used as the aforesaid stripping medium.

The solvent-rich extract phase is subjected to fractional distillation and other conventional operations as will be described so as to effect separation of alcohols from the solvent, which latter is recycled to the extraction step.

The aqueous phase, after the aforesaid stripping with hydrocarbons, retains organic acids, such as acetic acid, and may be subjected to treatment for the recovery of these acids.

As disclosed in related co-pending application, Serial Number 673,882, filed June 1, 1946, the displacement of oxygenated compounds from the water phase into the hydrocarbon phase is greatly increased at elevated temperature.

We find that stripping of the water phase under the conditions and in the manner described with an alcohol-free portion of the liquid hydrocarbon products, effects substantially complete recovery of non-acidic oxygenated compounds without separate and further treatment of the water. For example, the aqueous phase separated at atmospheric temperature and pressure from the products of a synthesis reaction may contain as much as 7–12 per cent or more of oxygenated compounds; whereas the aqueous phase separated from the same products at a temperature of 200° F. and under a pressure of 150 to 300 pounds per square inch will contain about 2.5 to 4.0 per cent oxygenated compounds. By stripping the aqueous phase separated at this elevated temperature and pressure with an alcohol-free portion of the hydrocarbon products, the residual water will contain only about 2.0 per cent oxygenated compounds which are almost entirely organic acids.

In order to describe the invention in more detail, reference will now be made to the accompanying drawing.

As indicated in the drawing, carbon monoxide and hydrogen, usually in the proportion of about two mols of hydrogen to one mol of carbon monoxide, are obtained from a source not shown and passed through a conduit 1 to a conventional synthesis unit 2. In the conduit 1, the fresh charge of synthesis gas may be supplemented by the addition of normally gaseous products of the conversion of synthesis gas.

In the synthesis unit 2, the reactants may be subjected to contact with a synthesis catalyst in the form of a fluidized mass of solid particles or powder. Preferably the catalyst contains iron as the hydrogenating metal although other synthesis catalysts using cobalt or nickel as hydrogenating metals may be used.

The synthesis reaction with an iron catalyst is usually carried out at a temperature in the range of about 500 to 700° F. and under a pressure of about 150 to 300 pounds per square inch. An iron catalyst which has proven particularly effective for synthesis of a mixture of hydrocarbons or oxygenated hydrocarbon derivatives contains about 96 per cent iron, about 2 to 3 per cent alumina and about 0.1 to 2 per cent alkali metal oxides such as potassium oxide.

An effluent stream, comprising mainly reaction products, leaves the synthesis unit 2 through a pipe 3 and is introduced into an exchanger 4. In the exchanger 4, the effluent stream is advantageously reduced to a temperature of about 200 to 350° F. without substantial reduction in pressure. The total effluent then passes through a pipe 5 into a separating column 6 which advantageously operates under substantially the same pressure as prevails in the synthesis unit. The pressure should be sufficient to maintain a water rich phase and a hydrocarbon rich phase.

In the column 6, there is effected separation of synthesis effluent into three phases: (1) a gas phase comprising mainly unreacted synthesis gas, carbon dioxide and normally gaseous hydrocarbon products, such as methane, ethane, and low boiling oxygenated compounds, etc.; (2) a hydrocarbon phase which is substantially free from fatty acids and which contains a major portion of the aliphatic alcohols having three or more carbon atoms per molecule, plus part of the ethyl alcohol produced in the conversion and which also contains small percentages of aldehydes and ketones; (3) a water phase containing a substantial portion of the ethyl alcohol product and a small percentage of other low boiling alcohols in addition to small percentages of low boiling aldehydes and ketones and substantially all of the lower molecular weight fatty acid products of conversion.

The utilization of the column 6 to effect stripping of the alcohols still remaining in the water phase will be described in more detail later.

The gas phase is withdrawn from the column 6 through a pipe 7. A portion of the gas phase may be recycled to the synthesis unit 2. The pipe 7 connects with the conduit 1 through which fresh synthesis feed is introduced into the synthesis unit 2. The non-recycled portion of the gas phase is discharged from the pipe 7 through a vent 8.

The hydrocarbon phase, containing substantially all of the non-acidic oxygenated compounds produced in the conversion, is withdrawn from the column 6 through a pipe 10. The withdrawn hydrocarbon phase is cooled as desired in an exchanger 11 and then proceeds through a pipe 12 to an extraction unit 15 which advantageously comprises a vertical packed tower.

In the extraction unit 15, the hydrocarbon phase is subjected to countercurrent contact with a stream of solvent liquid such as ethylene glycol at a temperature of about 70 to 350° F. and in the proportions of about ½ to 4 volumes of solvent per volume of hydrocarbon phase.

A raffinate phase or insoluble phase consisting essentially of hydrocarbons but still retaining a very small amount of solvent and alcohols is continuously drawn off from the extraction unit 15 through a pipe 16 and conducted to a wash tower 17 wherein the hydrocarbons may be subjected to countercurrent washing with a stream of water introduced through a pipe 18 in the proportion of about 0.1 volume of water to 1.0 volume of hydrocarbons at atmospheric temperature. This washing effects substantially complete removal of residual solvent. The washed hydrocarbons leave the wash tower 17 through a pipe 20. The alcohol-free, washed hydrocarbons are split into two portions which may be approximately equal. One portion is diverted from the pipe 20 and is introduced into a fractionating tower 23 through a pipe 22. In the fractionating tower 23, there is effected separation into a gasoline fraction and a gas oil fraction. The end boiling point of the gasoline may be in the vicinity of about 400° F.

Gas oil is withdrawn from the fractionating tower 23 through a pipe 24 and may be led to storage, or subjected to further treatment such as catalytic cracking, etc. The gasoline fraction is taken off the top of the tower 23 through a pipe 25 and is passed to an isomerization unit 26 wherein it is subjected to intimate contact with a solid finely divided catalyst, such as alumina or bauxite, at a temperature of about 800° F. so as to effect isomerization of the olefinic constituents of the gasoline fraction. An octane improvement is realized through treatment of the gasoline fraction in this manner and gasoline of high octane rating is obtained from the unit 26 through a pipe 27.

The other portion of the alcohol-free hydrocarbons obtained from the wash tower 17 through the pipe 20 passes along a pipe 30 and is forced by a pump 31 through a pipe 32 to the exchanger 4 in which it is heat-exchanged with the effluent from the synthesis unit 2. As a result of heat exchange, the alcohol-free hydrocarbons are raised to a temperature substantially equivalent to that existing in the column 6 and which temperature is between 200 and 350° F. The alcohol-free hydrocarbons are then introduced into the lower portion of the column 6 through a pipe 33 in order to effect further removal of alcohols from the aqueous phase.

The lower portion of the column 6 is advantageously packed with Raschig rings or the like so as to effect better contact between the aqueous phase and the recycled hydrocarbons flowing countercurrently therethrough. The aqueous phase initially forming in the intermediate portion of the column 6 contains a substantial portion of the ethyl alcohol produced in the conversion and minor portions of other lower boiling alcohols such as propyl and butyl. As this aqueous phase flows towards the bottom of the column 6, it is subjected, at elevated temperature and pressure to countercurrent contact with a stream of alcohol-free hydrocarbons which strip from the aqueous phase these residual lower boiling alcohols.

The stripped aqueous phase, substantially completely freed of alcohols, issues from the bottom of the column 6 through a pipe 35. This residual water phase contains a small amount of lower boiling aldehydes and ketones such as acetaldehyde and acetone and practically all of the lower molecular weight organic acids produced in the synthesis conversion. It may be treated so as to recover acids therefrom.

The recycled hydrocarbons dissolve the residual alcohols from the aqueous phase as they flow upwardly through the column 6. The recycled hydrocarbons containing dissolved alcohols combine with the hydrocarbon phase initially separating from the products of reaction in the upper portion of the column. Thence the combined hydrocarbon-alcohol mixture proceeds to the extraction unit 15 as previously described.

Aldehydes and ketones present in the mixture may be removed prior to passage to the extraction unit. This may be done by treating the mixture with sodium bisulfite solution or other suitable agent.

The solvent or extract phase obtained in the extraction unit 15 is continuously drawn off through a pipe 40 to a fractionating tower 41. This extract phase contains dissolved therein normally aliphatic alcohols ranging from 2 to 12 or more carbon atoms per molecule.

In the fractionating tower 41, which may be provided with a reboiler not shown, the alcohols which are more volatile than the solvent, which in this case is ethylene glycol, are removed as a distillate through a pipe 50. These alcohols comprise normal primary alcohols having up to seven carbon atoms per molecule.

The residual liquid drawn off from the fractionating tower 41 through pipe 42 comprises solvent and alcohols having an equivalent or higher boiling point than the solvent.

This residual liquid may be introduced into a still 43 in which the higher boiling alcohols are distilled from the glycol with the aid of steam introduced into the still 43 through a pipe 44.

The overhead stream from still 43 is passed through pipe 45 to a settler 47 wherein there forms an upper layer comprising $C_7$ and higher alcohols saturated with water and a lower layer consisting of water and some dissolved alcohols. The upper layer is removed through pipe 48 for such further treatment as desired. The bottom layer is drawn off through pipe 46 and returned to the bottom of the still.

Glycol, substantially water-free, is withdrawn from the still 43 through a pipe 52. A portion of this glycol may be recycled directly to the extraction unit 15 through a pipe 54. A further portion is introduced into a fractionating tower 56 through the pipe 52 for clarification or drying. There may be also introduced into the fractionating tower 56 through the pipe 57 the wash liquor comprising water and glycol from the wash tower 17. Water is distilled from the glycol in the tower 56 and is discharged therefrom through a pipe 59. The glycol is clarified by distillation in the tower 56 and is withdrawn therefrom as a sidestream through the pipe 60 and is then recycled to the extraction unit 15 through the pipe 54. A residuum containing impurities is discharged from the tower 56 through a pipe 61.

Ethylene glycol has been cited as an example of a selective solvent effective for the extraction of alcohols from hydrocarbons. It is contemplated that other solvents may be used to effect this extraction and among such compounds may be listed other glycols such as diethylene glycol or polyolefin glycols, polyhydric alcohols such as glycerol, amines such as ethanolamine and acids such as levulinic. Aldehydes, ketones and high molecular weight alcohols such as ultimately derived from the process may be used.

The synthesis reaction is advantageously effected with a fluidized mass of synthesis catalyst in solid particle form. It is contemplated that the catalyst may be used in the form of a stationary bed, a moving bed or a suspension of particles entrained in the reactants.

While specific temperatures and pressures have been referred to, it is contemplated that these will vary, depending upon what catalyst is employed and what particular products are desired. For example, the synthesis temperature employed may lie in the range of about 250 to 700° F. and reaction pressure may vary from atmospheric to about 1,000 pounds and over per square inch.

The hydrocarbons obtained with an iron type synthesis catalyst at temperatures in the range 500 to 700° F. consist essentially of aliphatic hydrocarbons, i. e., paraffins and olefins, and are substantially free from cyclic hydrocarbons. The synthesis naphtha exerts a high solvent action upon alcohols at temperatures of about 200 to 250° F. and therefore is particularly useful as a stripping medium.

Although specific mention has been made of employing the process for the treatment of products from a synthesis operation, it is contemplated that it may be applied to treating product mixtures of the general character in question derived from other sources. Moreover in the case of synthesis operations, conditions may be such that oxygenated compounds and water comprise the principal products of reaction.

Obviously many modifications and variations of the invention, as hereinbefore set forth, may be made without departing from the spirit and scope thereof, and, therefore, only such limitations should be imposed as are indicated in the appended claims.

We claim:

1. In the catalytic conversion of carbon monoxide and hydrogen at a temperature of 450 to 700° F. and superatmospheric pressure, into a product mixture comprising normally liquid hydrocarbons, water and oxygen-containing organic compounds, the improvement which comprises separating said product mixture into a gas phase, a hydrocarbon phase and a water phase at a temperature in the range of 175 to 350° F. and at a pressure sufficient to maintain substantially liquid phase conditions, removing oxygen-containing organic compounds from said hydrocarbon phase to form a hydrocarbon fraction relatively free of oxygen-containing organic compounds, subjecting said water phase to countercurrent contact with a portion of said oxygenate-free hydrocarbon fraction at an elevated temperature of about 175 to 350° F. and under a pressure sufficient to maintain substantially liquid phase conditions whereby there is formed a hydrocarbon extract phase containing non-acidic oxygenates and an aqueous raffinate of reduced non-acidic oxygenate content, discharging said raffinate phase and combining said hydrocarbon extract phase with the hydrocarbon phase originally separated from the liquid product.

2. The improvement according to claim 1 in which separation of the product mixture and countercurrent contact of the water phase are effected at a pressure in the range of 150 to 300 pounds per square inch.

3. The improvement according to claim 1 in which separation of synthesis product and countercurrent contact of aqueous phase are effected in the same vessel.

GEORGE B. ARNOLD.
HOWARD V. HESS.

REFERENCES CITED

The following references are of record in the file of this patent:

UNITED STATES PATENTS

| Number | Name | Date |
|---|---|---|
| 1,870,816 | Lewis | Aug. 9, 1932 |
| 2,083,125 | Scheuble | June 8, 1937 |
| 2,274,750 | Soenksen et al. | Mar. 3, 1942 |
| 2,410,642 | Farkas et al. | Nov. 5, 1946 |
| 2,417,164 | Huber | Mar. 11, 1947 |
| 2,476,788 | White | July 19, 1949 |

OTHER REFERENCES

Fischer, Conversion of Coal Into Oils, published by Ernest Benn Ltd., London (1925), 241–246.